REVERTIVE CALL CIRCUIT

Filed July 22, 1966 3 Sheets-Sheet 1

Aug. 12, 1969 G. O. K. SCHNEIDER 3,461,246

REVERTIVE CALL CIRCUIT

Filed July 22, 1966 3 Sheets-Sheet 3

United States Patent Office 3,461,246
Patented Aug. 12, 1969

3,461,246
REVERTIVE CALL CIRCUIT

Gerhard O. K. Schneider, Rochester, N.Y., assignor to Stromberg-Carlson Corporation, Rochester, N.Y., a corporation of Delaware Filed July 22, 1966, Ser. No. 567,156
Int. Cl. H04m 3/56
U.S. Cl. 179—17 14 Claims

ABSTRACT OF THE DISCLOSURE

In a telephone communication system, a revertive call circuit with means for generating an output signal in response to simultaneous receipt of a fixed polarity marker signal applied to a called party line circuit and pulses applied to a calling party line circuit, the output signal being indicative of the existence of a revertive call in the telephone switching equipment.

The present invention relates in general to communication systems, and more particularly to a revertive call circuit for use in conjunction with automatic electronic telephone switch equipment.

In telephone exchanges having party lines, it very often happens that a subscriber finds it necessary to call the subscriber with whom he shares the line circuit. In such cases, the normal busy-free test of the line circuit provided by the telephone exchange will produce a busy signal, since the line circuit of the called subscriber will have been opened by the calling subscriber, initiating the call. The type of call is known as a revertive call, and requires special equipment to indicate to the telephone exchange that the called and calling line circuits are identical and that the apparent busy condition of the called line circuit is due to the off-hook condition created by the calling subscriber.

Certain known revertive call circuitry requires that the calling subscriber dial the call number of the party line subscriber and then hang up until ringing of the calling and called parties subsets is tripped by the called party going off-hook. The calling party thereatfer goes off hook and both parties are connected together across the common line circuit. A special revertive call selector is utilized in conjunction with this equipment to prevent the switch train from being released when the calling party hangs up. In this typical known arrangement, a revertive call code must be dialed by the calling party followed by digits identifying the called party number so as to obtain access to the special revertive call circuit and effect interconnection through this circuit to the party line subscriber. However, as is apparent, the need for these special operating procedures including the dialing of special code numbers and the hanging up subsequent to the dialing and prior to answer by the called subscriber is inconvenient and bothersome to the subscriber.

Other revertive call arrangements have been provided in conjunction with automatic telephone equipment using relay transmission switching with register common control capable of monitoring line circuit conditions and automatically effecting the necessary operations to establish a transmission connection between calling and called subscribers. In one arrangement, the register upon receiving a busy signal from a line circuit recorded in the register as being a party line circuit causes a positive voltage potential to travel on the sleeve lead from the junctor via the concentrator switching stages to the calling line circuit. In the line circuit, a diode is provided between the sleeve lead S and the mark lead MK between the subscriber and the cut-off relay CO in the line circuit, which allows the positive potential to cross over to the mark lead MK. From the mark lead the positive potential attempts to return through the number indicator or marker contact to the revertive call bus and back to the register. The number indicator contact, which is unique for every line circuit, is closed by the register in order to mark the called line circuit, so that in the case that the calling line circuit connected via the transmission path and the junctor to the register is the same circuit as the called line circuit, as marked by the number indicator contact, the aforementioned positive potential will be permitted to return to the register. In any other case, when the two line circuits are different, the positive potential will find no path back to the register. The return of the positive potential to the register indicates to the register that a revertive call situation exists, and connection in spite of the apparent busy condition of the called line circuit is effected.

While the aforementioned revertive call circuit arrangement provides for automatic connection between party line subscribers, this solution requires that the number indicator provide a relay contact which is accessible on both sides so that it can be wired both to the line circuit on one side and to the revertive call bus on the other side. If due to the construction of the number indicator, this is not possible and the marking of the called line circuit is effected by a relay contact whose other side only leads to negative or another fixed potential, or if the number indicator includes an electronic device which cannot provide a thorough path, then a different solution to the revertive call problem is required.

Accordingly, the principal object of the present invention is to provide a new and improved revertive call circuitry.

It is a further object of the present invention to provide new and improved revertive call circuitry which eliminates the need for special relay equipment associated with other functions of the system.

It is a further object of the present invention to provide new and improved revertive call circuitry which is of simplified construction and capable of less expensive manufacture than known equipment of a similar type.

In accordance with the present invention, control means are provided in conjunction with each line circuit for providing an indication responsive to the coincident receipt of a marking signal applied to the called line subscriber and a revertive call check signal applied to the calling subscriber line circuit to indicate to the register control that a revertive call situation exists. In one embodiment of the invention, an AND gate arrangement is provided in each line circuit for receiving a marking signal marking the called line circuit and a signal of opposite polarity from the register processer, and directed to the calling line circuit, with coincidence of the two signals providing effective notification of the revertive call situation to the register processer.

In a second embodiment of the invention, a magnetic core arrangement is provided, which is set in one direction by the marking signal applied to the called line circuit and pulsed in the opposite direction by signals from the register processer directed to the calling line circuit. The change in state of the magnetic core is detected and applied to the register processer for providing indication of a reverting call situation.

These and other objects, features and advantages of the present invention will become more apparent from the following detailed description of the invention when taken in connection with the accompanying drawings which illustrate two embodiments of the present invention, and wherein.

Figure 1:
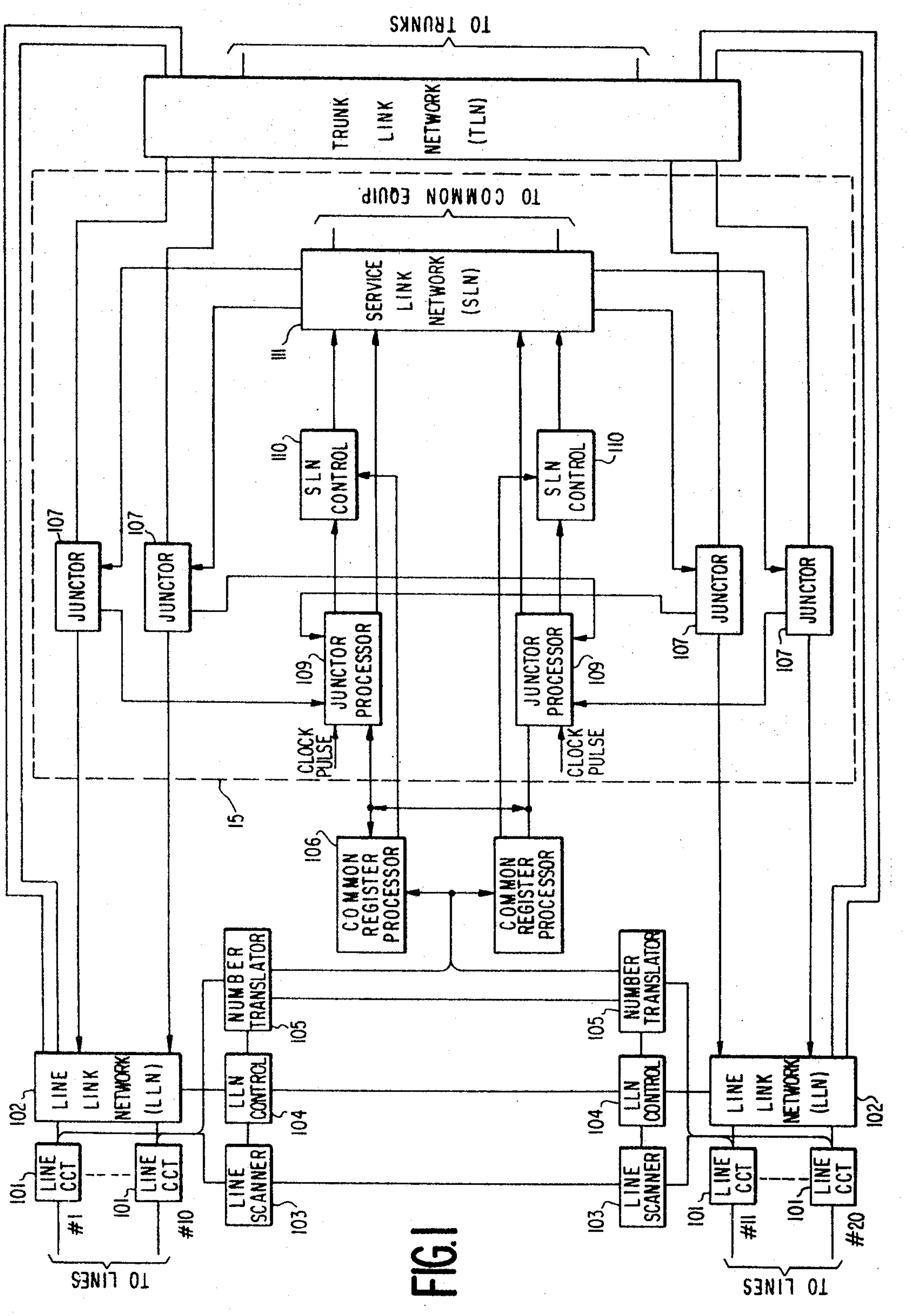
FIGURE 1 is a basic block diagram of the common control system with which the disclosed circuitry in accordance with the present invention may be associated.

Referring now the drawings, FIGURE 1 illustrates an overall schematic block diagram of the common control system including the programmed junctor circuit disclosed in U.S. applications Ser. No. 552,283 of James Gordon Pearce et al. filed May 23, 1966, with which the disclosed circuitry of the present invention may be operatively associated. A plurality of line circuits 101 are connected in groups of ten to line link network (LLN) 102 of which there are two provided in the illustrated embodiment for purposes of showing how a plurality of lines may be controlled simultaneously. A line scanner 103 is provided for each line link network 102 and is connected to each line circuit 101 associated therewith. The line scanner 103 is in turn connected to a line link network control 104 which, upon receipt of information from the line scanner as to an open line circuit conditions, locates the open line and marks it via the line link network control 104.

The line link network control 104 is connected to a number translator 105 which it also connected to the line scanner 103 and serves to provide information regarding the directory number of the line which is calling and of the required routing and class of service information for both the calling and called parties. A common register processer 106 is connected to the number translators 105 and in accordance with its internal program memory it controls the line network control 104 to mark both the calling line and the called line upon receipt of necessary information from the number translator 105 as translated from the dialed information from the calling subscriber. The system described to this point is similar to the register sender system described in U.S. applications Ser. No. 300,557 of James Gordon Pearce et al. filed Aug. 7, 1963.

A plurality of universal junctor circuits 107 which connect the line link network 102 through a trunk line network back to the line link network 102 or to outgoing trunk circuits, as required, are associated with junctor processor circuits 109 on a time division multiplex basis, the junctors associated with each junctor processes circuit being scanned repeatedly every ten milliseconds by the junctor processes to monitor the condition of the line circuits to which the individual junctors are connected. The junctor processer 109 detects the condition of the line circuit to which the individual junctor 107 is connected, returns dial tone to the calling party in response to control by the common register processer 106, detects dialed impulses via the line link network 102 and junctor 107, applies the dialed digits and other information regarding the condition of the line circuits to the common register processer 106, applies ringing and ring back to the called and calling parties in response to control from the common register processer 106 and controls the relays in the junctor 107 via a service link network control 110 and service line network 111 to provide connection between the various common circuits through the junctor to the calling and called line circuits. The junctor processer 109 is also continuously monitoring the transmission circuits to which the junctors 107 associated therewith are connected to provide supervisory control and response to service requests by either the calling or called parties.

Figures 2, 3:
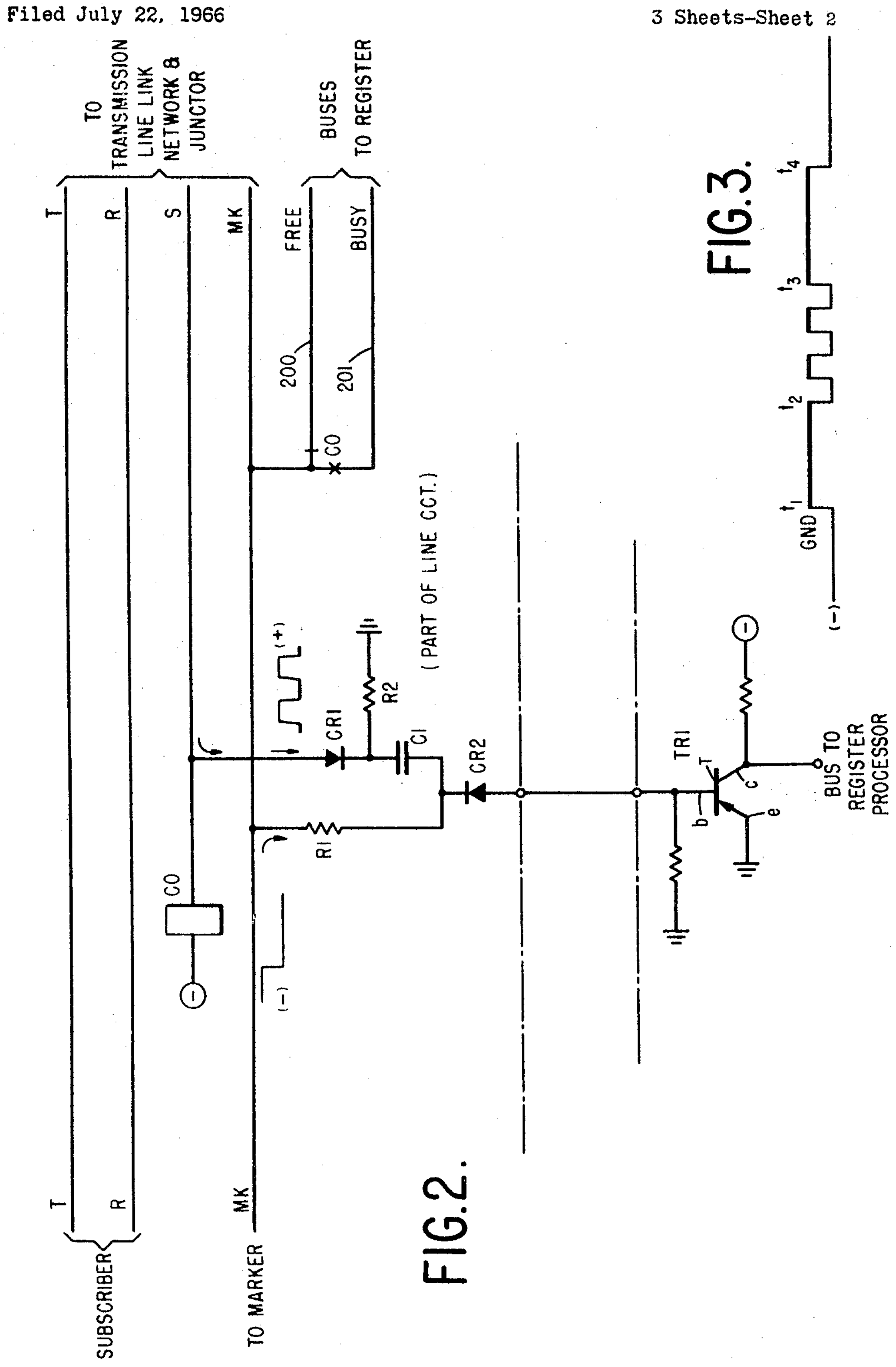
FIGURE 2 is a schematic diagram of one embodiment of the present invention.
FIGURE 3 is a chart of the output wave form derived from the circuit of FIGURE 2.

The revertive call circuit in accordance with the present invention which may be associated with the above described common control system is illustrated in FIGURE 2. The transmission lines T and R extend from the subscriber equipment through the line circuit to the line link network with the sleeve lead S being connected to the cut-off relay CO in the line circuit and extending through the line link network with the transmission lines to the junctor. The mark lead MK also extends from the line circuit through the line link network to the junctor and is marked, as indicated above, at the time that the line circuit is connected to the line link network. This interconnection of the line circuit with the line link network is effected through actuation of the relay CO in the well-known manner in response to an open line circuit condition created by removal of a subscriber handset.

The mark lead MK in the called line circuit is marked with a negative potential by a conventional marker arrangement in response to receipt and translation of dialing impulses representing the call number of the line circuit, which negative potential is applied to the free line 200 and busy line 201 connected to the register processer. If the line circuit called is already busy, as evidenced by actuation of the relay CO therein, the line 201 will be enabled by the contacts of the CO relay therein and the negative marking potential will be applied directly to the register processer indicating a busy condition in the line circuit. Also, in the well-known manner, if the called line circuit is not busy, evidenced by the unenergized condition of the relay CO, the line 200 to the register processer will be enabled permitting the negative marking signal to be applied thereto indicating the free condition of the line circuit.

In a party situation, where more than one subscriber shares a line circuit, a call by one party line subscriber to another party line subscriber will result in energization of the relay CO in the line circuit and subsequent marking of the mark lead MK therein resulting in enabling of the line 201 to the register processer indicating a busy condition therein. The present invention provides means in conjunction with the sleeve lead S and mark lead MK in the line circuit for determining that the calling line circuit and the called line circuit are in fact identical and that the called line subscriber is in effect not in the process of using his telephone as would apparently be indicated by the conditions in the line circuit.

In accordance with the present invention, as illustrated in FIGURE 2, a resistor R1 is connected to the mark lead MK in series with a diode CR2 and a transistor control circuit TR1. The transistor control circuit consists of a common emitter arrangement including transistor T having a base *b*, an emitter *e* and a collector *c*, wherein suitable application of a negative potential to the base *b* of the transistor effects connection of the collector *c* thereof through the emitter electrode *e* to ground.

There is also connected in accordance with the present invention a diode CR1 to the sleeve lead S in the line circuit in series with a capacitor C1, which is in turn connected at the junction between the resistor R1 and the diode CR2. A resistor R2 is connected between the point of connection of the diode CR1 and the capacitor C1 to ground. The collector of the transistor arrangement TR1 is connected through a bus directly to the register processer.

In the case of a revertive call, the relay CO in the line circuit will be energized with initiation of the call by the calling subscriber and upon receipt of the dialing digits representing the call number of the called line circuit, the register processer will effect a marking with a negative potential of the mark lead MK in the line circuit shared by the calling and called subscriber. In addition to being applied to the busy line 201 to the register processer, the negative marking potential will also be applied through resistor R1 and diode CR2 to the transistor arrangement TR1 to render the transistor conductive placing the collector at ground potential and applying a marking ground to the register processer.

Upon receiving the busy signal via the busy line 201 from the line circuit, the register processer will generate pulses of positive potential which are sent through the junctor circuit and the line link network and are applied to the sleeve lead S of the calling line circuit. These positive pulses are applied from the sleeve lead S to the diode CR1 and through the capacitor C1 where they are superimposed on the negative potential coming from the marker lead MK. The positive pulses applied through the line link network to the sleeve lead S in the line circuit should be long enough to overcome losses resulting from wiring capacitance but also short enough to find a sufficiently high impedance for all the relays which are operated in parallel from the sleeve lead. For example, pulses having an equal on and off time of approximately 50 microseconds may be used.

The superimposing of the negative potential coming from the marker lead MK and the positive pulses derived from the sleeve lead S results in a loss of drive potential to the transistor arrangement TR1 due to an ANDing of opposite polarity signals so that the transistor output will reflect pulses, in inverted form, applied from the sleeve lead S providing a pulsating output signal which may be recognized by the register processer as an indication that a revertive call situation exists.

If the positive pulses applied to the sleeve lead S and the negative marking signal applied to the called line circuit are applied to different line circuits, then the separation diode CR2 will prevent any interaction therebetween and the register processer will not receive impulses from the transistor arrangement TR1. Only the coincident application of the negative marking signal and the positive revertive check pulses to the same line circuit will result in the pulsating output from the transistor arrangement.

FIGURE 3 shows the wave form of the output from the collector of transistor arrangement TR1 during operation of the revertive call circuit in accordance with the invention. It is noted that between the times $t_1$ and $t_2$ the negative marking signal is being applied to the mark lead MK so that the transistor TR1 is conductive, the collector thereof being at ground potential. During the time between $t_2$ and $t_3$ the revertive call pulses from the register processer are applied via the sleeve lead S and are superimposed upon the negative marking signal so as to provide reflective pulses in the output of the transistor indicating a coincidence between the two signals in the revertive circuit in the line circuit. Betwen the times $t_3$ and $t_4$, once again only the negative marking signal is applied to the revertive call circuit so that impulsing is not detected in the output.

Figures 4, 5:
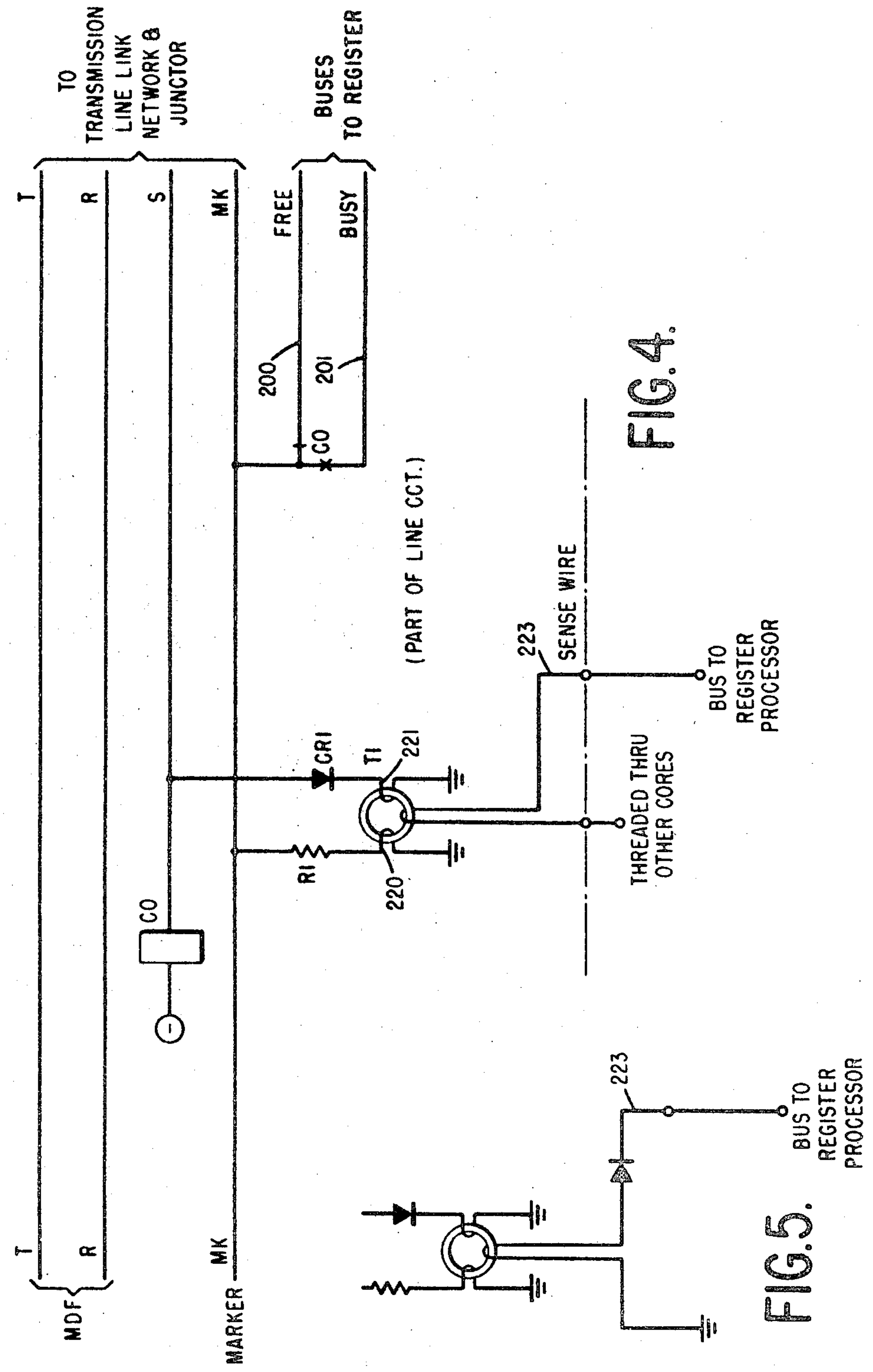
FIGURE 4 is a schematic circuit diagram of a second embodiment of the present invention.
FIGURE 5 provides an alternative sensing arrangement for the circuit of FIGURE 4.

Another embodiment of the revertive call arrangement of the present invention is illustrated in FIGURE 4. In this arrangement, a magnetic core T1 is provided in place of the transistor circuit of the previous embodiment. The resistance R1 is connected between the marking lead MK in the line circuit and a loop threaded through magnetic core T1, having a square hysteresis characteristic. The diode CR1 connected to the sleeve lead S is also connected to a loop 221 threaded through the magnetic core T1. A sense wire 223 is then looped through the magnetic core T1 and connected to a bus connected directly to the register processer.

In operation of this device, the marker once again marks the called line circuit via the MK lead with a negative potential at the time that the call number of the called line circuit is detected by the register processer via the number translator. Once again, in a revertive call situation, the relay CO in the line circuit will be energized due to the fact that the call was initiated from this line circuit and the negative marking signal will pass through line 201 to the register processer providing an indication that the called line circuit is busy. The negative marking potential is also extended, as in the previous embodiment, via resistor R1 to the loop 220 on the magnetic core T1 to set the magnetic core to one of its binary states. The amount of current applied via the resistance R1 is sufficiently accurately controlled by the voltage applied to the marking lead MK and by the value of resistor R1 to premagnetize the core in such a way that when the register processer transmits positive pulses through the diode CR1 to the loop 221 of the magnetic core T1 will reset the core producing output pulses on the sense wire 223. This impulsing on the sense wire 223 is detected by the register processer and serves as an indication that coincidence has occurred in the revertive call circuit between the negative marking signal applied to the called line circuit and positive pulses applied to the calling line circuit. The result is that a revertive call situation is recognized and further control by the register processer effects interconnection between the parties.

In case the positive pulses are applied to the sleeve lead S of a line circuit, but the mark lead MK of this line circuit is not marked with a negative potential, then the magnetic flux will not change the state of the core T1 since the magnetization current of the positive pulses is unidirectional and therefore not capable of reversing the magnetization present in the core. Thus, no detectable pulses will occur on the sense wire 223 and no revertive call situation will be recognized in the register processer.

The interconnection of the sense wire 223 to the bus connected to the register processer may be effected in two ways. As illustrated in FIG. 4, this sense wire may be threaded through a plurality of other cores associated with other line circuits in the system so that the sense windings on each of the cores T1 are effectively in series On the other hand, an arrangement may be provided such as illustrated in FIG. 5 wherein the sense wires are connected in parallel via separation diodes CR2 with one end of the sense winding being connected to ground and the other end being connected to the bus to the register processer.

In both embodiments of the revertive call circuit disclosed above, pulses of appropriate length are used for producing coincidence in the revertive call arrangement. The reason for doing so is to produce a distinct signal on the revertive call check bus to the register processer so that the processer can easily recognize these pulses as an indication of a revertive call arrangement. Since all of the holding coils of the transmission switch relays are connected to the sleeve lead in parallel, a plane direct current positive potential would find a low impedance on the one side and heat up the relay coils on the other side. As a result, it would be almost impossible to make an effective comparison with the marking signal and to receive a nonambiguous revertive call check signal in the register. Thus, appropriate control of the length of the pulses applied by the sleeve lead S to the revertive call circuit is important to operation of the invention to obtain optimum results.

While I have shown and described several embodiments in accordance with the instant invention, it is understood that the same is not limited thereto, but is susceptible of numerous changes and modifications as known to a person skilled in the art, and I therefore do not wish to be limited to the details shown and described herein but intend to cover all such changes and modifications as are encompassed by the scope of the appended claims.

I claim:

1. In a telephone communication system for establishing communication between parties including a plurality of line circuits each having a busy line indicating means and supervisory means for applying supervisory signals to said line circuits, a revertive call circuit for interconnecting calling and called parties sharing a common line circuit, marker means for applying a fixed polarity marker signal to a called party line circuit, means for applying a plurality of pulses to a calling party line circuit in response to enabling of the busy line indicating means therein, said revertive call circuit including generating means generating an output signal indicative of a revertive call situation in response to detection of simultaneous receipt of said fixed polarity marker signal and said pulses in said common line circuit associated therewith.

2. The combination defined in claim 1 wherein said marker signal and said pulses are of opposite polarity.

3. The combination defined in claim 2 wherein said generating means includes a transistor circuit which is normally non-conducting, and impedance means for connecting said marker signal to said transistor circuit in control thereof, said marker signal being of proper polarity to switch said transistor circuit to its conducting state.

4. The combination defined in claim 3 wherein said generating means further includes diode means connecting said pulses to said transistor circuit in control thereof, said pulses being of a polarity to switch said transistor to its non-conducting state.

5. The combination defined in claim 2 wherein said generating means includes a magnetic core having first and second binary states, and means for sequentially applying said marker signal and said pulses to said magnetic core to effect a switching thereof resetting and setting said core, respectively.

6. The combination defined in claim 5 further including a sense winding on the magnetic core in the generating means of each line circuit, said sense windings being connected in series.

7. The combination defined in claim 5 further including a sense winding on the magnetic core in the generating means of each line circuit, said sense winding being connected in parallel.

8. The combination defined in claim 1 wherein said pulses have an approximately 50 microsecond duration.

9. In combination with a line circuit of a telephone communication system having a pair of transmission lines, a supervisory signal line, a marker line and an indicating means connected to said marker line for indicating the busy condition of said line circuit, a revertive call circuit comprising control means connected respectively to said marker line and said supervisory signal line for providing an output signal indicating a revertive call situation in response to simultaneous receipt of opposite polarity signals on said respective lines.

10. The combination defined in claim 9 further including marker means for applying a marker signal to the marker line of a called line circuit and supervisory signal means for applying a supervisory signal to the supervisory line of a calling line circuit having an indicating means indicating a busy condition thereof.

11. The combination defined in claim 10 wherein said supervisory signal is in the form of regular pulses of approximately 50 microsecond duration.

12. The combination defined in claim 10 wherein said control means is in the form of a switchable normally non-conducting circuit and said marker signal is of proper polarity to switch said circuit to its conducting state, said supervisory signals being of opposite polarity to said marker signal.

13. The combination defined in claim 10 wherein said control means is in the form of a magnetic core switchable between said first and second binary states, said marker signal and said supervisory signal having such polarities as to effect a resetting and setting of the core, respectively.

14. The combination defined in claim 13, further including a sense winding wound on said magnetic core for detecting a change in state of said core.

No references cited.

KATHLEEN H. CLAFFY, Primary Examiner

D. L. RAY, Assistant Examiner